United States Patent Office 3,703,468
Patented Nov. 21, 1972

3,703,468
WATER-SCAVENGING COMPOSITION FOR
HYDRAULIC FLUIDS
Samuel Chess, Palos Verdes Estates, and Bruce B. Cleveland, San Pedro, Calif., assignors to The Upjohn Company, Kalamazoo, Mich.
No Drawing. Filed Mar. 9, 1971, Ser. No. 122,554
Int. Cl. C09k 3/00
U.S. Cl. 252—77   8 Claims

ABSTRACT OF THE DISCLOSURE

Water-scavenging compositions are provided containing a mixture of (a) polymethylene polyphenyl polyisocyanate and (b) a 2,2-di(lower-alkoxy)propane or a tri(lower-alkyl)orthoformate or mixtures thereof. These compositions are particularly useful in combination with hydraulic fluids which are to be operated at temperatures below the freezing point of water.

BACKGROUND OF THE INVENTION (1) Field of the invention

This invention relates to water-scavenging compositions and to their use and is more particularly concerned with polyisocyanate containing water-scavenging compositions and with their use in the dehydration and stabilization of hydraulic fluids and the like.

(2) Description of the prior art

Organic polyisocyanates, including polymethylene polyphenyl polyisocyanates, have been used as dehydrating agents by virtue of the ease with which the isocyanato groups react with water in accordance with the following reaction scheme:

$$R\text{—}NCO + H_2O \rightarrow [RNHCOOH] \rightarrow RNH_2 + CO_2$$

The amine so generated then reacts with a further molecule of isocyanate to give the corresponding urea:

$$R\text{—}NCO + RNH_2 \rightarrow RNHCONHR$$

When the polyisocyanate is used as dehydrating agent in a composition such as a hydraulic fluid whose viscosity is required to remain relatively constant, problems are encountered because of the conversion of the polyisocyanates to the corresponding ureas of higher molecular weight. Gradual increase in viscosity occurs in the composition as the result of progressive formation of the polyureas. Hence the amount of polyisocyanate which can be incorporated into such fluids without causing excessive changes in viscosity is very limited.

Similarly, 2,2-di(lower-alkoxy)propanes such as 2,2-dimethoxypropane have long been recognized as a dehydrating agent; for example, U.S. Pat. 2,878,109 describes the use of 2,2-dimethoxypropane as a dehydrating agent for liquid hydrocarbon fuels and U.S. Pat. 2,987,384 describes the use of 2,2-dimethoxypropane to stabilize gasoline containing various organoborate additives. The compounds act in this manner by reaction with water as follows:

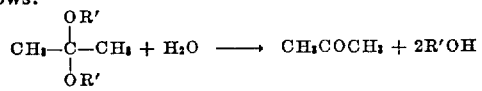

wherein R' represents lower-alkyl.

It will be seen that this reaction generates two liquids, namely acetone and the corresponding lower-alkanol of low viscosity and relatively high volatility. Accordingly, the use of 2,2-dimethoxypropane and like 2,2-di(lower-alkoxypropanes) as dehydrating agent in hydraulic and like fluids, in which viscosity change is undesirable, has not been practical due to the generation of acetone and a lower alkanol with consequent lowering of viscosity of the hydraulic fluid.

The use of tri(lower-alkyl)orthoformates such as triethylorthoformate as water scavenging agents is also well known in the art; see, for example, Kesslin et al. Ind. Eng. Chem. Prod. Research and Development, 5 (1), 27–9, 1966. The use of these compounds as water scavenging agents in one component polyurethane varnishes has been described; Netherlands application 6404866. The compounds act by reaction with water as follows:

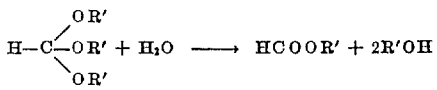

wherein R' is lower-alkyl.

It will be seen that this reaction generates two liquids, namely the alkylformate and the corresponding lower-alkanol, which are each of lower viscosity and higher volatility than the starting orthoformate. Accordingly, for the same reasons discussed above in connection with the 2,2-di(lower-alkoxy)propane, the use of tri(lower-alkyl) orthoformates as dehydrating agents in hydraulic and like fluids has not been practical hitherto.

We have now found that the use of a mixture of polymethylene polyphenyl polyisocyanate and a 2,2-di(lower-alkoxy)propane or a tri(lower-alkoxy)orthoformate, or mixtures of the latter two compounds, for water scavenging purposes gives unexpectedly useful results in that the drawbacks hitherto encountered in the use of these various compounds separately is not encountered when they are used in combination in certain proportions. We have further found that the novel combination of these components, to be described hereinafter, is particularly valuable as a water scavenging agent for use in hydraulic fluids and the like. The use of the combination results in no substantial change in viscosity even though substantial amounts of water are removed from the hydraulic fluid over a prolonged period of time. The novel combinations of the invention are particularly valuable as water scavenging agents for hydraulic fluids such as those used in pumps and the like in below ground operations in permafrost and like locations where presence of free water in said fluid could result in separation of ice and failure of equipment.

SUMMARY OF THE INVENTION

This invention comprises water-scavenging compositions which comprise a mixture of (a) from about 90 percent to about 25 percent by weight of a polymethylene polyphenyl polyisocyanate and (b) from about 10 percent to about 75 percent by weight of a member selected from the group consisting of compounds of the formulae:

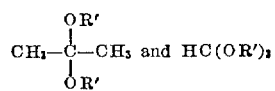

wherein R' is lower-alkyl, and mixtures of said compounds.

The invention also comprises hydraulic fluids having incorporated therein the water-scavenging compositions of the invention.

The term "lower-alkyl" as used herein means alkyl from 1 to 6 carbon atoms, inclusive. Illustrative of lower-alkyl are methyl, ethyl, propyl, butyl, pentyl, hexyl and isomeric forms thereof. The term "lower-alkoxy" as used herein means alkoxy from 1 to 6 carbon atoms, inclusive. Illustrative of lower-alkoxy are methoxy, ethoxy, propoxy, butoxy, pentyloxy, hexyloxy, and isomeric forms thereof.

DETAILED DESCRIPTION OF THE INVENTION

The water-scavenging compositions of the invention are prepared by simple admixture of the various components in the appropriate proportions. No special techniques are required save that the operation be carried out under relatively anhydrous conditions, e.g. in an atmosphere of dry nitrogen, in order to minimize the loss of part of the dehydrating power of the combination.

Similarly, the preparation of hydraulic and like fluids which are stabilized against contamination by water by incorporation of a water-scavenging composition of the invention therein, requires no special techniques. Simple admixture of the untreated fluid with the appropriate proportion of water-scavenging composition of the invention is all that is needed.

The amount of water-scavenging composition of the invention which is incorporated in the hydraulic fluid and the like can vary over a wide range of proportions depending upon the degree of stabilization required. Thus, the water-scavenging compositions of the invention can be employed as such as a hydraulic fluid. Advantageously, however, the water-scavenging compositions of the invention are incorporated in conventional hydraulic and like fluids in accordance with the invention in amounts ranging from about 5 percent to about 50 percent by weight. Preferably said amount is within the range of about 15 percent to about 30 percent by weight of said hydraulic or like fluid. The hydraulic fluids which are treated in the above manner with a water-scavenging composition of the invention, can be any of those conventionally employed in the art; said fluids generally comprise a relatively high boiling hydrocarbon oil in which are incorporated, optionally, additives such as lubricants, anticorrosion agents and the like.

The polymethylene polyphenyl polyisocyanates which are employed in the water-scavenging compositions of the invention are well known in the art and are the products obtained by phosgenation of mixtures of methylene-bridged polyphenyl polyamines obtained by the interaction of formaldehyde, hydrochloric acid, and aniline. Such polyisocyanates can be obtained in various forms in which the content of methylenebis(phenyl isocyanate) ranges from about 35 percent to about 85 percent by weight, the remainder of such mixtures being polymethylene polyphenyl polyisocyanates of functionality higher than 2.0. The content of methylenebis(phenyl isocyanate) is related to the conditions, particularly the proportion of aniline to formaldehyde, employed in preparing the mixture of polyamines from which the polyisocyanates are obtained by phosgenation. The preparation of the polymethylene polyphenyl polyisocyanates having methylenebis(phenyl isocyanate) contents over the above range is well known in the art; see, for example, U.S. Pats 2,683,730; 2,950,263; and 3,012,008; Canadian Pat. 665,495 and German Pat. 1,131,877. Particularly preferred polyisocyanates for use in the preparation of compositions of this invention are the polymethylene polyphenyl polyisocyanates which contain approximately 50 percent by weight of methylenebis(phenyl isocyanate).

Similarly, the 2,2-di(lower-alkoxy)propanes employed in the compositions of the invention are known compounds which can be prepared by methods well-known in the art; see, for example, U.S. Pat. 2,490,337 and Crocker et al., J. Chem. Soc., 1955, page 2052 et seq. Illustrative of 2,2-di-(lower-alkoxy)propanes are 2,2-dimethoxypropane, 2,2-diethoxypropane, 2,2-dibutoxypropane and 2,2-dihexyloxypropane.

The tri(lower-alkyl)orthoformates which are employed in the compositions of the invention are also well-known compounds which can be prepared by conventional methods, e.g. by reaction of chloroform with the appropriate sodium alkoxide in alcohol solution; see, Chemistry of Carbon Compounds, Ed. E. H. Rodd, vol. I, 553-4, 1951, Elsevier. Illustrative of tri(lower-alkyl)orthoformates are trimethylorthoformate, triethylorthoformate, triisopropylorthoformate and trihexylorthoformate.

The proportion of polymethylene polyphenyl polyisocyanate to 2,2-di(lower-alkoxy)propane and/or tri(lower-alkyl)orthoformate employed in the water-scavenging compositions of the invention can be varied over a wide range depending upon a number of factors, the chief of which are the desired overall viscosity of the composition and the amount of water which the composition is required to scavenge. Thus, on a weight by weight basis the 2,2-di(lower-alkoxy)propane or the tri(lower-alkyl)orthoformate is capable of removing more water than the polyisocyanate. On the other hand, the 2,2-di(lower-alkoxy)propane and the tri(lower-alkyl)orthoformate generally have lower viscosity than the polyisocyanate and accordingly the amount of the former compounds which is incorporated in the water-scavenging compositions of the invention is limited by the desired viscosity of the end product.

In general the water-scavenging compositions of the invention contain from about 5 to about 90 percent by weight of 2,2-di(lower-alkoxy)propane or tri(lower-alkyl)orthoformate, or mixtures thereof, the remainder of said composition being polymethylene polyphenyl polyisocyanate. In a preferred embodiment, the water-scavenging compositions of the invention contain from about 10 to about 30 percent by weight of 2,2-di(lower-alkoxy)propane or tri(lower-alkyl)orthoformate or mixtures thereof, the remainder of said compositions being polymethylene polyphenyl polyisocyanate.

While any 2,2-di(lower-alkoxy)propane or tri(lower-alkyl)orthoformate can be employed in the compositions of the invention in combination with the polymethylene polyphenyl polyisocyanate, we prefer to use 2,2-dimethoxypropane or triethylorthoformate or a mixture thereof.

While we do not wish to be bound by any particular theory, we believe that the unexpectedly useful properties of the water-scavenging compositions of the invention are, in part, due to the following considerations. This discussion is offered by way of explanation only and is not intended in any way to limit the scope of this invention.

The various components of the water-scavenging compositions will react concurrently, although at different rates, with any water in the system to which they are exposed. The tendency of the di(lower-alkoxy)propanes and tri(lower-alkyl)orthoformates to lower the viscosity of the system by generation of lower viscosity fluids (acetone, alkyl formate, alkanols) will be offset, in part, by the generation of higher viscosity polyureas by reaction of water with the polyisocyanate and, in part, by the removal of the liberated alkanols from the system by reaction with the polyisocyanate to form the corresponding polyurethane without any significant increase in viscosity. Further the urethanes so produced from the polyisocyanate are generally soluble in the hydraulic fluid and no problem therefore arises by reason of deposition of solid material.

The following examples describe the manner and process of making and using the invention and set forth the best mode contemplated by the inventors of carrying out the invention but are not to be construed as limiting.

Example 1.—A water-scavenging composition of the invention was prepared by blending (i) 50 parts by weight of polymethylene polyphenyl polyisocyanate containing about 50 percent by weight of methylenebis(phenyl isocyanate) (PAPI ®: equivalent weight 133, viscosity 450 cps. at 70° F.) and (ii) 50 parts by weight of 2,2-dimethoxypropane. The resulting composition was a free-flowing liquid having a viscosity of 15 cps. at 0° F. and 10 cps. at 70° F. This composition was used to stabilize a hydraulic fluid (heavy duty Lockheed Brake Fluid No. 21B), being used in a pump located below ground in permafrost, against deposition of ice therein by incorporating in said hydraulic fluid 10 parts of the above composition per 100 parts by weight of said hydraulic fluid.

Example 2.—A water-scavenging composition of the invention was prepared by blending 75 parts by weight of polymethylene polyphenyl polyisocyanate (PAPI ®; see Example 1) with 25 parts by weight of 2,2-dimethoxypropane. The resulting mixture had a viscosity of 155 cps. at 0° F. and 20 cps. at 70° F.

A corresponding composition was prepared as above but replacing the 25 parts by weight of 2,2-dimethoxypropane there used by 25 parts of triethylorthoformate.

Example 3.—A water-scavenging composition of the invention was prepared by blending 90 parts by weight of polymethylene polyphenyl polyisocyanate (PAPI ®; see Example 1) with 10 parts by weight of 2,2-dimethoxypropane. The resulting mixture had a viscosity of 960 cps. at 0° F. and 75 cps. at 70° F.

We claim:

1. A water-scavenging composition which consists essentially of a mixture of (a) from about 90 percent to about 25 percent by weight of a mixture of polymethylene polyphenyl polyisocyanates containing from about 35 percent to about 85 percent by weight of methylenebis(phenyl isocyanate) the remainder of said mixture being polymethylene polyphenyl polyisocyanates of functionality higher than 2.0 and (b) from about 10 percent to about 75 percent by weight of a member selected from the group consisting of compounds of the formulae:

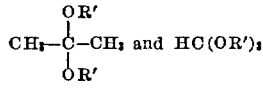

wherein R' is lower-alkyl, and mixtures of said compounds.

2. A composition according to claim 1 wherein the polymethylene polyphenyl polyisocyanate is a mixture containing about 50 percent by weight of methylenebis(phenyl isocyanate), the remainder of said mixture being polymethylene polyphenyl polyisocyanates having a functionality greater than 2.0.

3. A composition according to claim 1 wherein the component (b) is 2,2-dimethoxypropane.

4. A composition according to claim 1 wherein the component (b) is triethylorthoformate.

5. A hydraulic fluid stabilized against deposition of ice crystals upon exposure to operating temperatures below the freezing point of water which consists essentially of a hydrocarbon oil containing from about 5 percent to about 50 percent by weight of a mixture of (a) a mixture of polymethylene polyphenyl polyisocyanates containing from about 35 to about 85 percent by weight of methylenebis(phenyl isocyanate) the remainder of said mixture being polymethylene polyphenyl polyisocyanates of functionality higher than 2.0 and (b) a member selected from the group consisting of compounds of the formulae:

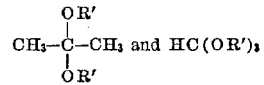

wherein R' is lower-alkyl, and mixtures of said compounds, the ratio of parts by weight of component (a) to component (b) being from 9:1 to 1:3.

6. A hydraulic fluid according to claim 5 wherein the polymethylene polyphenyl polyisocyanate is a mixture containing about 50 percent by weight of methylenebis(phenyl isocyanate), the remainder of said mixtures being polymethylene polyphenyl polyisocyanates having a functionality greater than 2.0.

7. A hydraulic fluid according to claim 5 wherein the component (b) is 2,2-dimethoxypropane.

8. A hydraulic fluid according to claim 5 wherein the component (b) is triethylorthoformate.

References Cited

UNITED STATES PATENTS

| 2,878,109 | 3/1959 | Wood et al. | 44—58 |
| 2,987,384 | 6/1961 | Hughes | 44—63 |
| 3,637,557 | 1/1972 | Little | 252—77 X |

HERBERT B. GUYNN, Primary Examiner

D. SILVERSTEIN, Assistant Examiner

U.S. Cl. X.R.

252—75, 194